United States Patent
Ugajin et al.

(10) Patent No.: US 8,031,377 B2
(45) Date of Patent: Oct. 4, 2011

(54) ENCRYPTING IMAGE DATA BASED ON PAPER FIBER PROPERTIES, PRINTING ENCRYPTED IMAGE, AND DECRYPTING ENCRYPTED IMAGE

(75) Inventors: Atsushi Ugajin, Ebina (JP); Toshio Hisamura, Ebina (JP); Yoshitake Matsubara, Ebina (JP); Hirokazu Tsubota, Ebina (JP); Satoshi Kurashima, Ebina (JP); Osamu Yasui, Ebina (JP); Yasuhiro Arai, Ebina (JP); Masaki Fujise, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 627 days.

(21) Appl. No.: 12/061,841

(22) Filed: Apr. 3, 2008

(65) Prior Publication Data

US 2009/0080027 A1    Mar. 26, 2009

(30) Foreign Application Priority Data

Sep. 26, 2007  (JP) .................................. 2007-248853

(51) Int. Cl.
  *H04N 1/44* (2006.01)
  *B41M 3/14* (2006.01)
  *G09C 5/00* (2006.01)
  *B42D 15/00* (2006.01)
(52) U.S. Cl. ............... 358/3.28; 380/54; 380/55; 283/73
(58) Field of Classification Search .................. 358/3.28; 283/72, 73, 112; 380/54, 55; 713/170, 176
  See application file for complete search history.

(56) References Cited

U.S. PATENT DOCUMENTS

| | | | | |
|---|---|---|---|---|
| 5,974,150 A * | 10/1999 | Kaish et al. | ................ | 713/179 |
| 7,028,188 B1 | 4/2006 | Moore | | |
| 7,089,420 B1 * | 8/2006 | Durst et al. | ................ | 713/176 |
| 7,152,047 B1 * | 12/2006 | Nagel | ................ | 705/76 |
| 7,162,035 B1 * | 1/2007 | Durst et al. | ................ | 380/54 |
| 7,766,241 B2 * | 8/2010 | Tomita | ............. | 235/462.11 |
| 7,773,749 B1 * | 8/2010 | Durst et al. | ................ | 380/54 |
| 2006/0115110 A1 * | 6/2006 | Rodriguez et al. | ............ | 382/100 |
| 2006/0244253 A1 * | 11/2006 | Wei | ................ | 283/81 |
| 2008/0013727 A1 * | 1/2008 | Uemura | ............... | 380/243 |

FOREIGN PATENT DOCUMENTS

| | | |
|---|---|---|
| JP | 11-215119 A | 8/1999 |
| JP | 2002-099209 A | 4/2002 |
| JP | 2002-236960 A | 8/2002 |
| JP | 2004-112644 A | 4/2004 |
| JP | 2005-050041 A | 2/2005 |
| JP | 2007-194962 A | 8/2007 |

OTHER PUBLICATIONS

Japanese Office Action dated Feb. 2, 2010 for Japanese Patent Application No. 2007-248853 and English-language translation.

* cited by examiner

*Primary Examiner* — Scott A Rogers
(74) *Attorney, Agent, or Firm* — Sughrue Mion, PLLC

(57) ABSTRACT

An image forming apparatus includes a paper fiber reading unit that reads fiber properties of a paper sheet; an encryption unit that encrypts at least a part of an input image based on the fiber properties read by the paper fiber reading unit; and a printing unit that prints an encrypted image portion encrypted by the encryption unit and an image including information representing the fiber properties read by the paper fiber reading unit on the paper sheet whose fiber properties are read by the paper fiber reading unit.

12 Claims, 8 Drawing Sheets

PAPER FIBER READING PART 18

(A) ORIGINAL PAGE (B) PRINT PAGE, PART OF WHICH IS MADE INVISIBLE

IMAGE FORMING PROCESS (S10)

IMAGE DECRYPTION PROCESS (S20)

PRINT PAGE, PART OF WHICH IS MADE INVISIBLE
(INCLUDING MARKING)

ENCRYPTING IMAGE DATA BASED ON PAPER FIBER PROPERTIES, PRINTING ENCRYPTED IMAGE, AND DECRYPTING ENCRYPTED IMAGE

CROSS-REFERENCE TO RELATED APPLICATIONS

This application is based on and claims priority under 35 USC 119 from Japanese Patent Application No. 2007-248853 filed Sep. 26, 2007.

BACKGROUND

1. Technical Field

The present invention relates to an image forming apparatus, an image processing device, an image forming system, a paper medium, an image forming method, an image processing method, and a computer readable medium storing a program.

2. Related Art

In an asymmetric public key cryptosystem, conventionally, two encryption keys, a private key and a public key, are used. A private key is only known to the person who has it and a public key is open to the public. A premise is that the private key is unknown to others than the person who has it.

SUMMARY

According to an aspect of the invention, an image forming apparatus includes a paper fiber reading unit that reads fiber properties of a paper sheet; an encryption unit that encrypts at least a part of an input image based on the fiber properties read by the paper fiber reading unit; and a printing unit that prints an encrypted image portion encrypted by the encryption unit and an image including information representing the fiber properties read by the paper fiber reading unit on the paper sheet whose fiber properties are read by the paper fiber reading unit.

BRIEF DESCRIPTION OF THE DRAWINGS

Exemplary embodiments of the present invention will be described in detail based on the following figures, wherein:

FIGS. 5A and 5B illustrate a print image, a part of which is made invisible by the image forming apparatus 10 according to an exemplary embodiment of the invention, wherein FIG. 5A shows an original page before an image portion is made invisible and FIG. 5B shows a print page in which a part of the original page is made invisible;

DETAILED DESCRIPTION

To begin with, a first exemplary embodiment of the invention is described.

Figure 1:
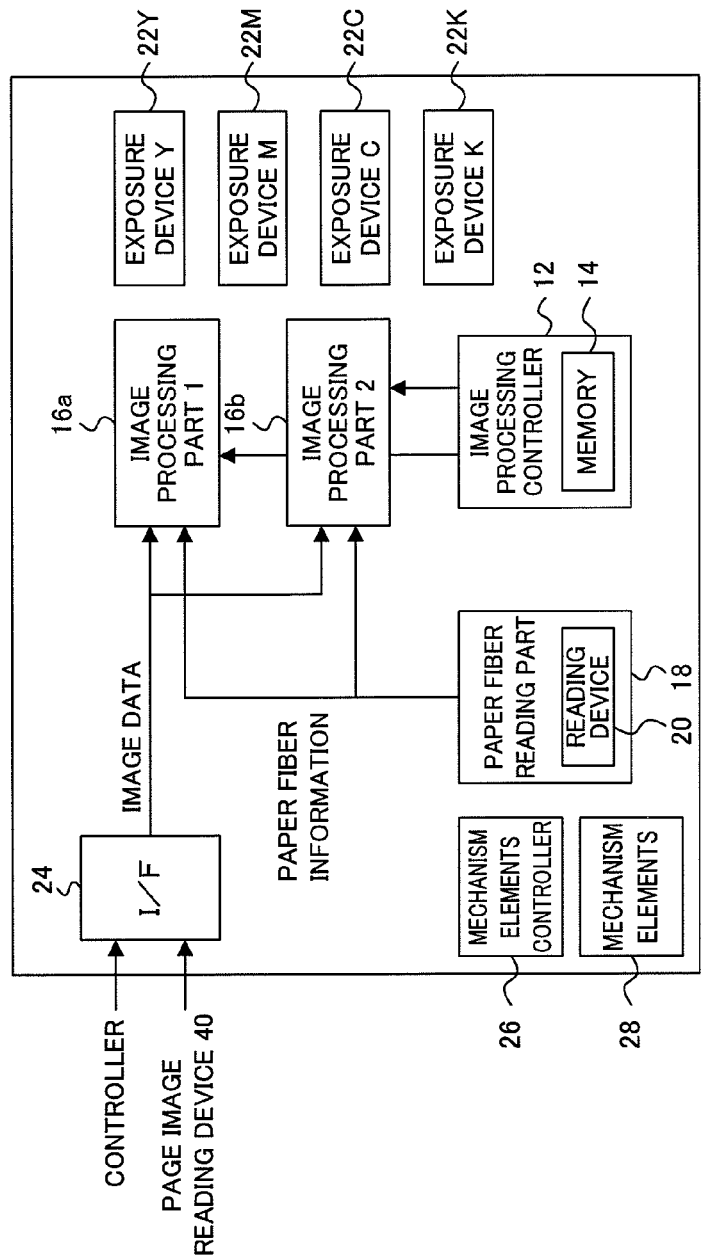
FIG. 1 is a block diagram showing a configuration of an image forming apparatus 10 according to an exemplary embodiment of the invention.

FIG. 1 is a block diagram showing a configuration of an image forming apparatus 10 according to an exemplary embodiment of the invention.

As shown in FIG. 1, the image forming apparatus 10 includes an image processing controller 12, a first image processing part 16a, a second image processing part 16b, a paper fiber reading part 18, exposure devices 22Y, 22M, 22C, 22K, an interface (IF) device 24, a mechanism elements controller 26, and mechanism elements 28. Where it is not needed to identify any of plural components such as image processing parts 16a, 16b, these may be simply represented by a single component as an image processing part 16.

The image processing controller 12 has a memory 14 and controls the first image processing part 16a and the second image processing part 16b. In the memory 14, image data, programs, etc. are stored.

An image processing part 16 has an image processing device and a fiber properties encoding device which are not shown. The image processing part 16 performs image processing tasks which are predetermined on image data under control of the image processing controller 12. In particular, the image processing part 16 encodes fiber properties read by the paper fiber reading part 18 which will be described later and thus generates encoded fiber data. Using this encoded data, it encrypts at least a part of the input image and generates image data including an encrypted image and image data including fiber information. The image processing part 16 then digitizes the generated image data and outputs it as a laser drive signal to the appropriate exposure device 22. In this way, the image processing parts 16 constitute an encryption unit.

The paper fiber reading part 18 has a reading device 20 and, using this reading device 20, reads fiber properties (also called a paper fingerprint) in a given place on a paper sheet on which an image is printed and, then, outputs the fiber properties to at least one of the image processing parts 16a and 16b. The reading device 20 may read fiber properties of a sheet from a paper stack set in a paper supply part (tray) which is not shown or of a sheet being transported through a paper transport path which is not shown. The reading device 20 may read fiber properties of either the face or the reverse side of a paper sheet. The paper fiber reading part 18 will be detailed later.

The exposure devices 22Y, 22M, 22C, 22K are, for example, of a laser scanning type and project latent images onto respective image carriers which are not shown, according to a signal output from the image processing part 16. Here, the exposure devices 22Y, 22M, 22C, 22K are responsible for yellow (Y), magenta (M), cyan (C), and black (K), respectively. The exposure devices 22, image carriers, and development devices constitute a printing unit that prints an image which is produced by the image processing parts 16.

The IF device 24 receives image data from an external controller which is not shown and a page image reading device 40 which will be described later and outputs the image data to at least one of the image processing parts 16a, 16b. The mechanism elements 28 include other components required to form an image, such as the paper supply part, paper transport path, and image forming parts which include the image carriers and development devices.

Accordingly, if security protection of information is set by a user, fiber properties are read by the paper fiber reading part 18 and output to, for example, the first image processing part 16a. In the first image processing part 16a, the fiber properties are encoded and encoded fiber data is generated. When image data is input from the controller or the page image reading device 40 via the IF device 24 to, for example, the first image processing part 16a, the image data is processed in the first image processing part 16a.

In the image processing, the image data is encrypted based on the encoded fiber data so that at least a part of the image will be invisible. For example, in a fixed-format image, a partial image region including personal information becomes invisible. Further, the encoded fiber data is included in the image data so that the encoded fiber data (fiber properties) is printed in a given place in a paper sheet as a part of the image. Here, the encoded fiber data is combined into a part of the image as, for example, a two-dimensional code such as QR code or a bar code or the like. A laser drive signal corresponding to the image data is output to the exposure devices 22, latent images are formed on the image carriers and developed by the development devices, and a composite image is printed on the paper sheet.

Figure 2:
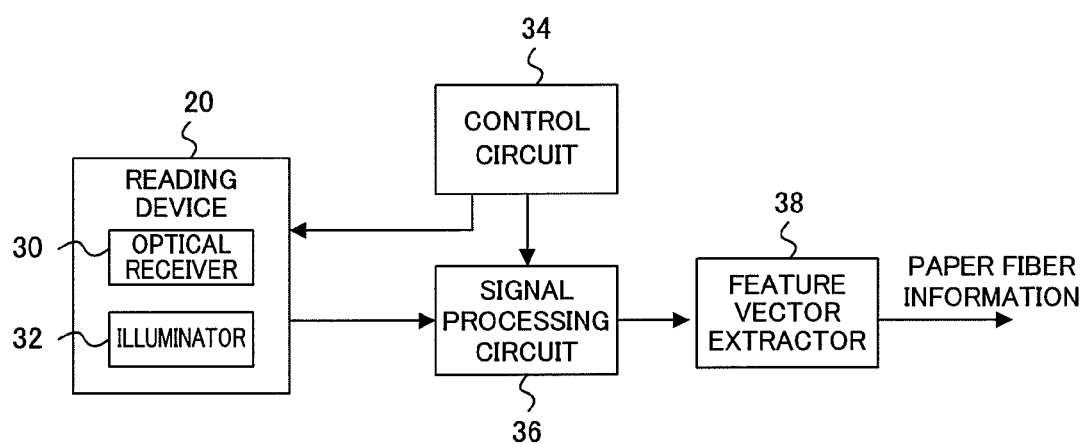
FIG. 2 is a block diagram showing a detailed configuration of a paper fiber reading part 18.

FIG. 2 is a block diagram showing a detailed configuration of the paper fiber reading part 18.

As shown in FIG. 2, the paper fiber reading part 18 includes a reading device 20, a control circuit 34, a signal processing circuit 36, and a feature vector extractor 38, the reading device including an optical receiver 30 and an illuminator 32. The illuminator 32 illuminates a paper sheet when reading the fiber properties of the sheet. The optical receiver 30 receives light reflected by the paper sheet illuminated by the illuminator 32.

The control circuit 34 controls all components included in the paper fiber reading part 18. The signal processing circuit 36 takes input of a signal output from the optical receiver 30 of the reading device 20, performs predetermined signal processing on the signal, and outputs it as a read image signal to the feature vector extractor 38. The feature vector extractor 38 extracts fiber features from the read image and outputs these features as paper fiber information.

Paper is made of plant fibers which twist together intricately. These plant fibers are generally 4 to 70 μm wide; they are 10 to 50 μm wide for plain paper made of a broad-leaved tree and 20 to 70 μm wide for plain paper made of a conifer tree. The feature vector extractor 38 extracts a feature vector of a random pattern of plant fibers within a region of, for example, 1 to 2 mm square, included in a paper sheet.

Figure 3:
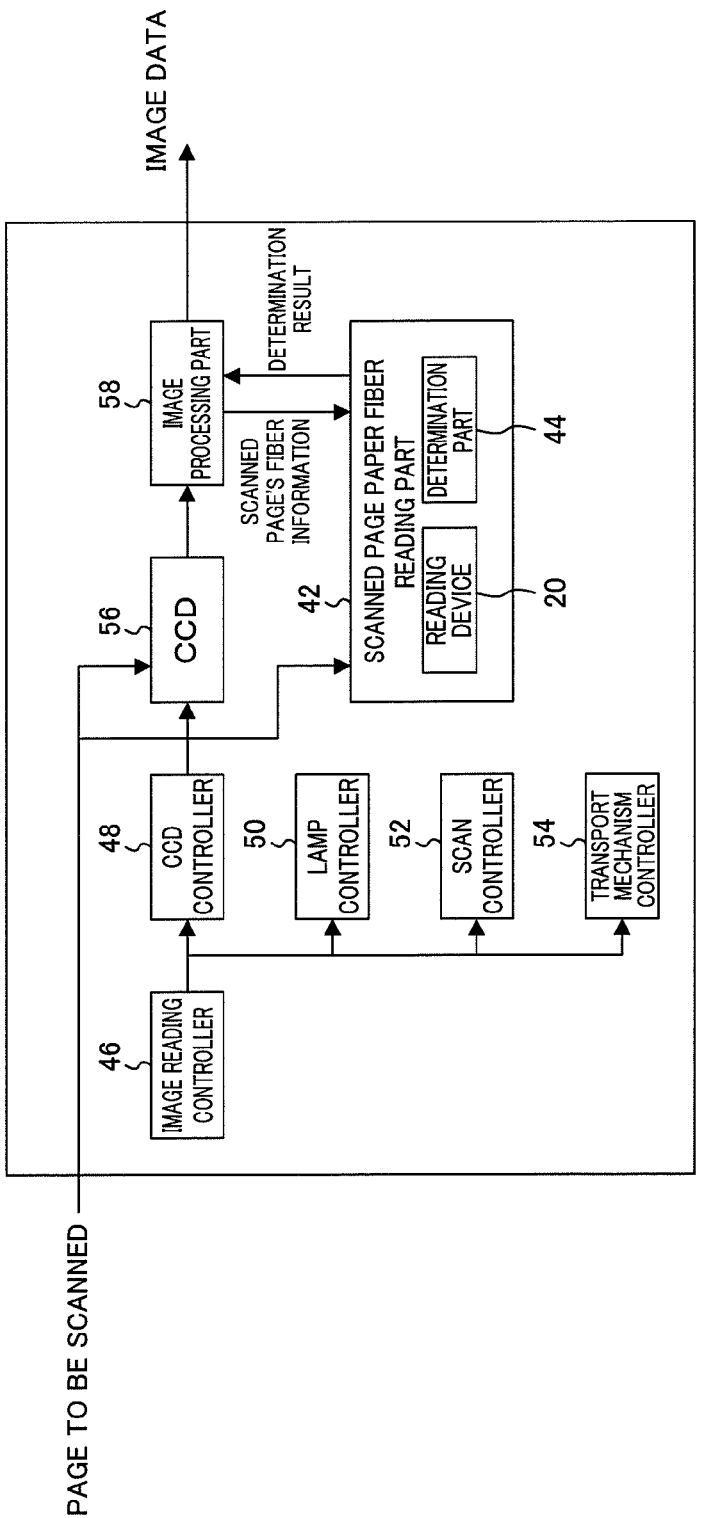
FIG. 3 is a block diagram showing a configuration of a page image reading device 40 according to an exemplary embodiment of the invention.

FIG. 3 is a block diagram showing a configuration of the page image reading device 40 according to an exemplary embodiment of the invention.

As shown in FIG. 3, the page image reading device 40 includes a scanned page paper fiber reading part 42, an image reading controller 46, a CCD controller 48, a lamp controller 50, a scan controller 52, a transport mechanism controller 54, a CCD (Charge Coupled Device) 56, and an image processing part 58, wherein the scanned page paper fiber reading part 42 includes a reading device 20 and a determination part 44. In the configuration shown in FIG. 3, a component that is substantially the same as the corresponding one shown in FIG. 1 is assigned the same reference number.

The image reading controller 46 controls all components included in the page image reading device 40. The CCD controller 48 controls the CCD 56. The lamp controller 50 controls the light intensity or the like of a lamp assembly which is not shown. The scan controller 52 controls the operation of a carriage on which the lamp assembly is mounted. The transport mechanism controller 54 controls the mechanism elements for transporting a sheet of a scanned page. The CCD 56 takes in a scanned page image as electronic information and outputs it to the image processing part 58. The CCD 56 constitutes an image reading unit that reads images printed by the image forming apparatus 10, those are, an encrypted image and an image including fiber information.

The image processing part 58 performs predetermined image processing tasks on a scanned page image which is output from the CCD 56. More specifically, the image processing part 58 derives fiber information from encoded fiber data included as, for example, a two-dimensional code in a given region of the scanned page image and outputs it as the scanned page's fiber information to the scanned page paper fiber reading part 42.

The image processing part 58 makes an invisible partial image region visible in the scanned page image, based on a determination result output from the scanned page paper fiber reading part 42 which will be described later. More specifically, if it is determined that there is a match between two data pieces for comparison, the image processing part 58 decrypts the encrypted image region, using the fiber information read by the scanned page paper fiber reading part 42. In this way, the image processing part 58 constitutes a decryption unit. The image processing part 58 may decrypt the image region, using paper fiber information which is derived from the encoded fiber data by the image processing part 58.

The scanned page paper fiber reading part 42 reads a scanned page's fiber properties in a given place, using the reading device 20. The determination part 44 of the scanned page paper fiber reading part 42 compares information representing the read scanned page's fiber properties with scanned pages' fiber information output from the image processing part 58, determines whether there is a match between both, and outputs a determination result to the image processing part 58. The scanned page paper fiber reading part 42 will be detailed later.

Accordingly, when a page image is scanned, optical information input to the CCD 56 by scanning the page is converted into electronic data which is in turn input to as image data to the image processing part 58. In the image processing part 58, the scanned page's fiber information is derived from, for example, a two-dimensional code included in the image. On the other hand, the scanned page's fiber properties are read by the scanned page paper fiber reading part 42. In the scanned page paper fiber reading part 42, information representing the read scanned page's fiber properties is compared with the scanned page's fiber information received from the image processing part 58. If it is determined that there is a match between both, the image processing part 58 decrypts an invisible partial region encrypted previously in the image and makes the region visible.

Figure 4:
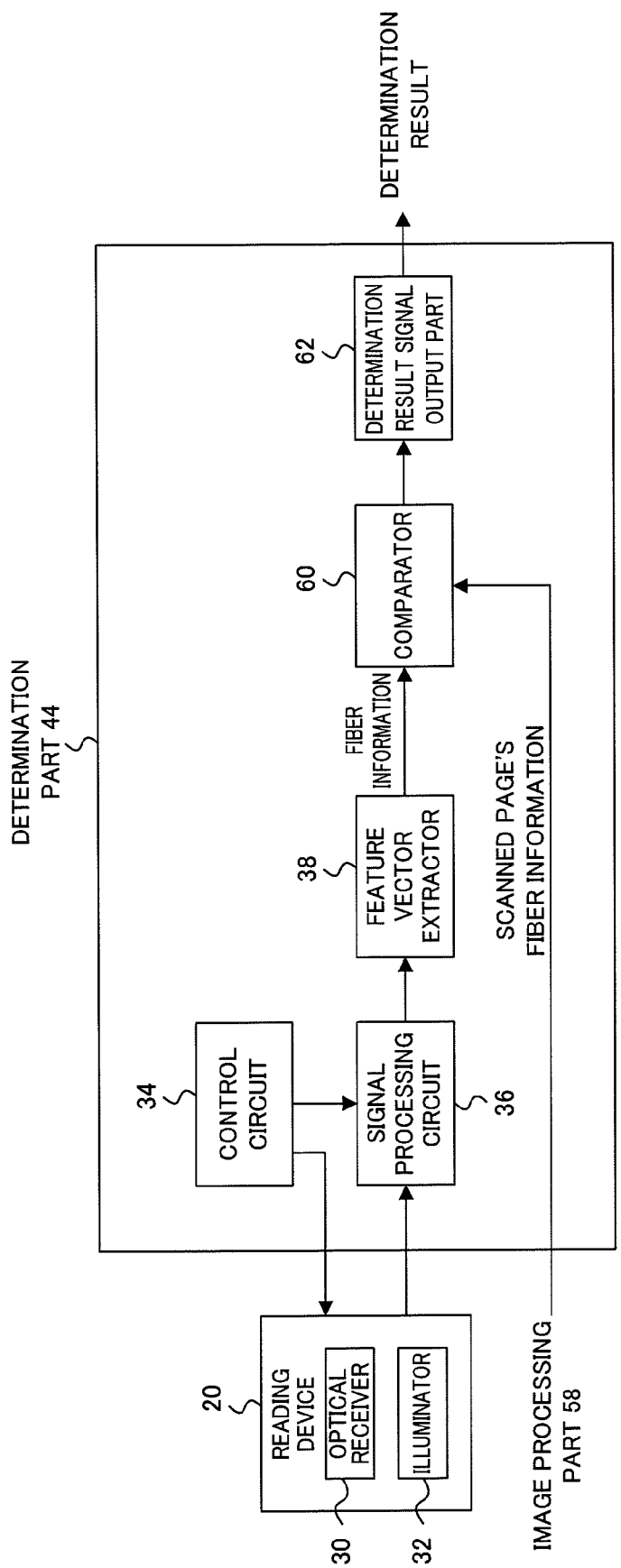
FIG. 4 is a block diagram showing a detailed configuration of a scanned page paper fiber reading part 42.

FIG. 4 is a block diagram showing a detailed configuration of the scanned page paper fiber reading part 42.

As shown in FIG. 4, the scanned page paper fiber reading part 42 includes the reading device 20 and the determination part 44, wherein the reading device 20 includes an optical receiver 30 and an illuminator 32 and the determination part 44 includes a control circuit 34, a signal processing circuit 36, a feature vector extractor 38, a comparator 60, and a determination result signal output part 62. In the configuration shown in FIG. 4, a component that is substantially the same as the corresponding one shown in FIG. 2 is assigned the same reference number.

In the determination part 44, the comparator 60 compares a scanned page's fiber information output from the feature vector extractor 38 with a scanned page's fiber information received from the image processing part 58. The determination result signal output part 62 outputs a result of determination as to whether or not there is a match between the pair of the scanned pages' fiber information to the image processing part 58.

Figure 5:
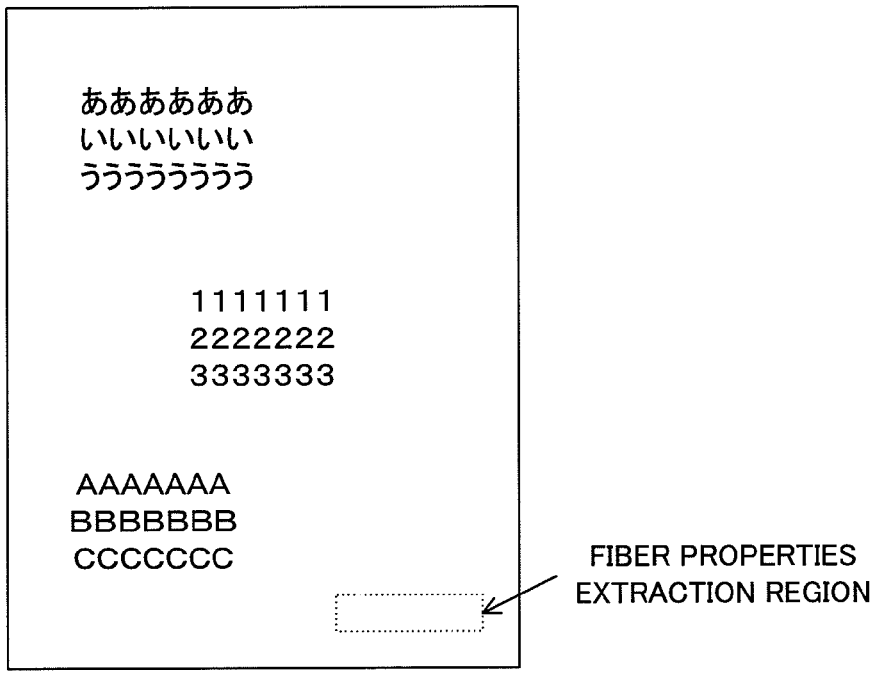
Figure 5:
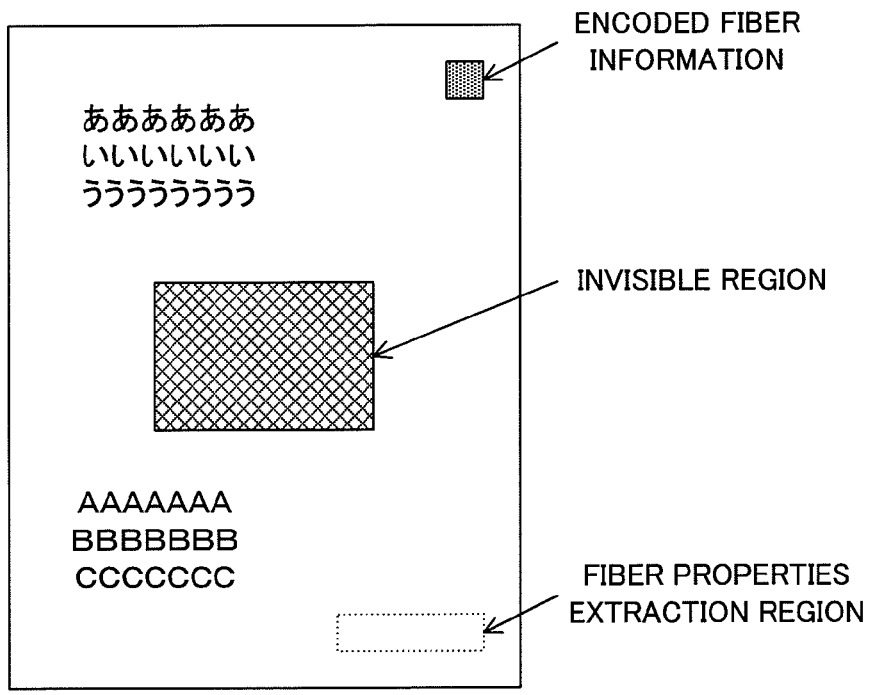

FIGS. 5A and 5B illustrate a print image, a part of which is made invisible by the image forming apparatus 10 according to an exemplary embodiment of the invention, wherein FIG. 5A shows an original page before an image portion is made invisible and FIG. 5B shows a print page in which a part of the original page is made invisible.

As illustrated in FIGS. 5A and 5B, the print page is a paper sheet including fiber information. The print page includes a visual code (e.g., two-dimensional code, bar code, etc.) in which fiber properties extracted from a fiber properties extraction region are encoded and an image region (invisible region) where the image is encrypted based on the fiber information encoded in the visual code.

The invisible region is the region where personal information is described in, for example, a fixed format. The position of the fiber properties extraction region is not limited to this example and may be any place on either the face or the reverse side of a print page.

Figure 6:
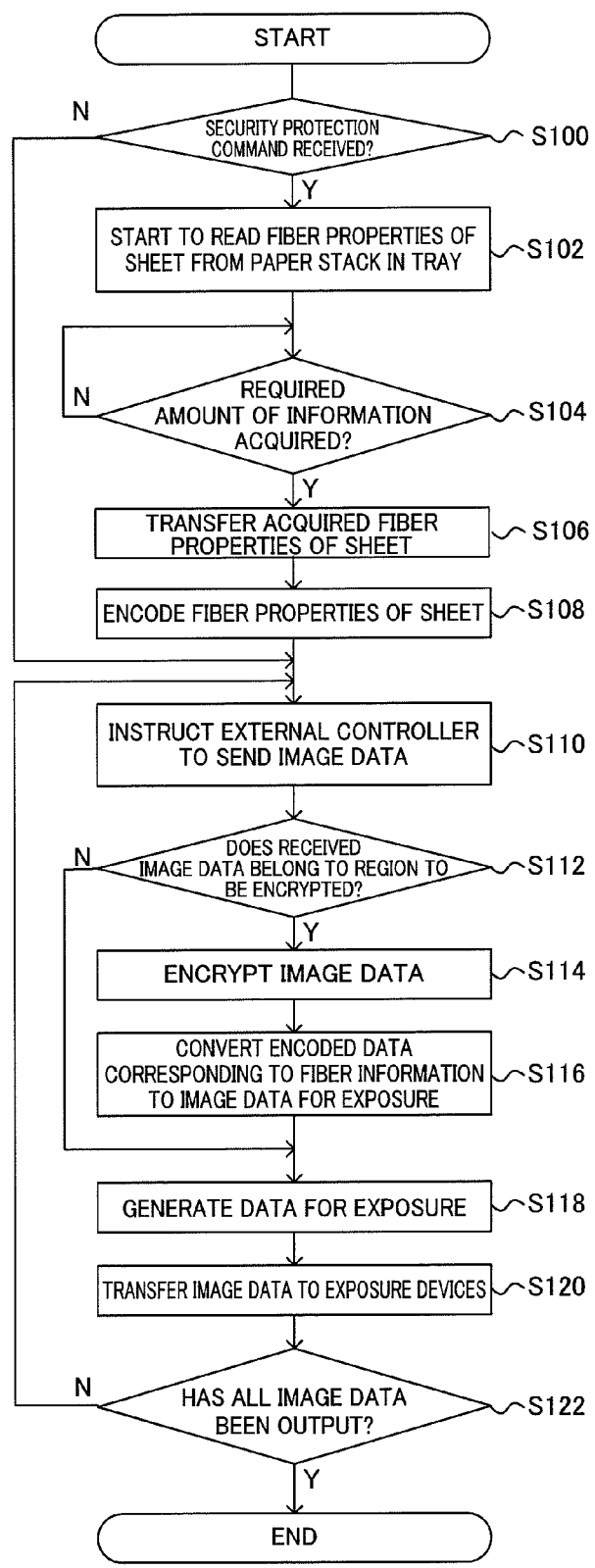
FIG. 6 is a flowchart illustrating an image forming process (S10) which is performed by the image forming apparatus 10 according to an exemplary embodiment of the invention.

FIG. 6 is a flowchart illustrating an image forming process (S10) that is performed by the image forming apparatus 10 according to an exemplary embodiment of the invention.

As is illustrated in FIG. 6, at step 100 (S100), the image processing controller 12 of the image forming apparatus 10 determines whether it has received a security protection command from the user. For example, the user enters the security protection command to encrypt a partial region of an input image and make this region invisible via a control panel, not shown, installed on the image forming apparatus 10. Upon having received the security protection command, the image forming apparatus 10 goes to step S102; otherwise, it goes to step S110.

At step 102 (S102), the paper fiber reading part 18 starts to read fiber properties in a predetermined place on a sheet from a paper stack in the paper supply part.

At step 104 (S104), the paper fiber reading part 18 determines whether it has acquired a required amount of information for fiber properties of the sheet. If it has acquired a required amount of information, the paper fiber reading part 18 goes to step 106; otherwise, it returns to step S104.

At step 106 (S106), the paper fiber reading part 18 outputs acquired fiber properties of the sheet to at least one of the image processing parts 16a, 16b (for example, to the image processing part 16a).

At step 108 (S108), the image processing part 16a encodes the fiber properties of the sheet and generates encoded fiber data.

At step 110 (S110), the image processing controller 12 instructs an external controller or the page image reading device 40 to send image data. Image data is input via the IF device 24 to at least one of the image processing parts 16a, 16b (for example, to the image processing part 16a).

At step 112 (S112), the image processing part 16a determines whether the received image data belongs to a partial image in the region to be encrypted in the input image. If the image data belongs to the partial image to be encrypted, the image processing part 16a goes to step S114; otherwise, it goes to step S110.

At step 114 (S114), the image processing part 16a encrypts the image data using the encoded data and makes the partial image corresponding to this image data invisible.

At step 116 (S116), the image processing part 16a converts the encoded data to image data for exposure. Specifically, the image processing part 16a generates image data so that the encoded data is embedded as a two-dimensional code in a part of the image.

At step 118 (S118), the image processing part 16a digitizes the image data and generates data for exposure.

At step 120 (S120), the image processing part 16a outputs the image data as a laser drive signal to the exposure devices 22. Then, latent images are formed on the image carriers by the exposure devices 22 and the encrypted partial image and the two-dimensional code are printed on the sheet from which the paper fiber properties are read.

At step 122 (S122), the image processing controller 12 determines whether all image data is output. If it is determined that all image data is output, the image forming apparatus 10 terminates the process; otherwise, it returns to step S110.

In this manner, the image forming apparatus 10 reads fiber properties of a paper sheet, encrypts at least a part of an input image based on the read fiber properties, and prints an encrypted image and an image including information representing the fiber properties on the sheet from which the fiber properties are read.

The above process may be carried out under control of a program that runs on the image forming apparatus 10. In this case, the program may be provided from, for example, an external computer connected to a network which is not shown to the image forming apparatus 10 and loaded into the memory 14. Thereafter, the program may be executed by the image processing controller 12. Alternatively, the program may be stored in a storage medium such as FD, CD, or DVD and provided to the image forming apparatus 10. As for another program which will be mentioned later, it can be provided in the same way.

Figure 7:
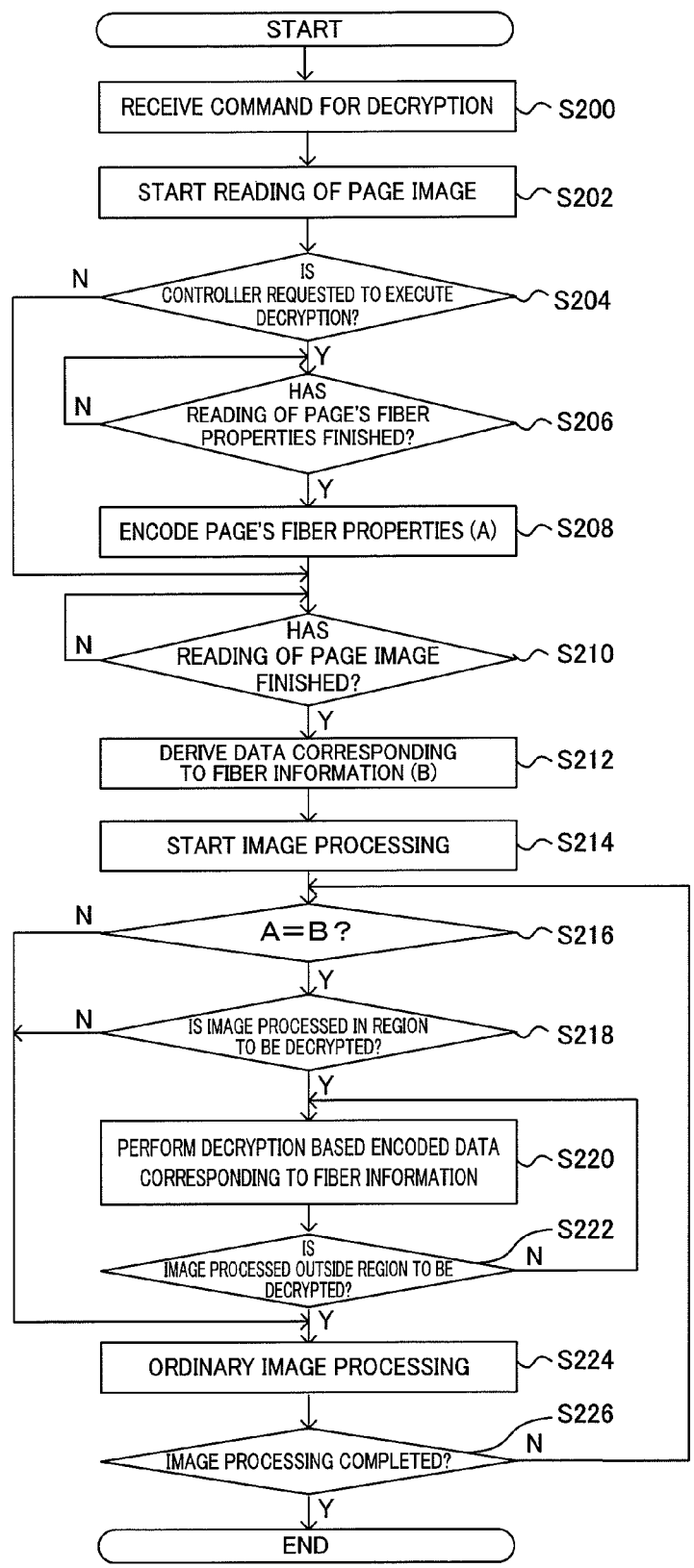
FIG. 7 is a flowchart illustrating an image decryption process (S20) which is performed by the page image reading device 40 according to an exemplary embodiment of the invention.

FIG. 7 is a flowchart illustrating an image decryption process (S20) that is performed by the page image reading device 40 according to an exemplary embodiment of the invention.

As is illustrated in FIG. 7, at step 200 (S200), the image reading controller 46 of the page image reading device 40 receives a command to scab a page and a command to decrypt the encrypted region, entered by the user. If the page image does not need to be decrypted, the controller 46 may not receive the command for decryption.

At step 202 (S202), the image reading controller 46 controls the components of the page image reading device 40 to start reading of the page image.

At step 204 (S204), the image reading controller 46 determines whether it is requested to decrypt the image. If the controller 46 is requested to execute decryption, it goes to step S206; otherwise, it goes to step S212.

At step 206 (S206), the scanned page paper fiber reading part 42 reads fiber properties of the page in a predetermined position on the page and determines whether the reading of the page's fiber properties has finished. If the reading of the page's fiber properties has finished, the scanned page paper fiber reading part 42 goes to step S208; otherwise, it returns to step S206.

At step 208 (S208), the scanned page paper fiber reading part 42 encodes the page's fiber properties and generates encoded fiber data. This encoding is performed in the same encoding method as applied in the image processing part 16 of the image forming apparatus 10. The encoded fiber data thus generated is also referred to as encoded data A.

At step 210 (S210), the image reading controller 46 determines whether the reading of the page image has finished. If the reading of the page image has finished, the image reading controller 46 goes to step S212; otherwise, it returns to step S210.

At step 212 (S212), the image processing part 58 derives data relevant to fiber information from a two-dimensional code embedded in a given region on the read page and outputs it to the scanned page paper fiber reading part 42. This data is encoded data into which paper fiber properties of the sheet are read and encoded in the image forming apparatus 10. This derived encoded fiber data is also referred to as encoded data B.

At step 214 (S214), the image processing part 58 starts image processing.

At step 216 (S216), the scanned page paper fiber reading part 42 determines whether there is a match between encoded data A and encoded data B, and outputs a determination result to the image processing part 58. If there is a match between encoded data A and encoded data B, the image processing part 58 goes to step S218; otherwise, it goes to step S224.

At step 218 (S218), the image processing part 58 determines whether a partial image region in which the image should be processed is the region to be decrypted. If the partial image region is the region to be decrypted, the image processing part 58 goes to step S220; otherwise, it goes to step S224.

At step 220 (S220), the image processing part 58 performs decryption of the encrypted image region using encoded data (for example, encoded data A) corresponding to fiber information.

At step 222 (S222), the image processing part 58 determines whether a partial image region in which the image should be processed goes outside the region to be decrypted. If the partial image region goes outside the region to be decrypted, the image processing part 58 goes to step S224; otherwise, it returns to step S220.

At step 224 (S224), the image processing part 58 performs ordinary image processing. Specifically, it performs image processing tasks (for example, tone correction processing, color conversion processing, etc.) other than decryption on the image data input from the CCD 56.

At step 226 (S226), the image processing part 58 determines whether image processing is completed. If the image processing is completed, the image processing part 58 terminates the process; otherwise, it returns to step S216.

The decrypted image may be output to the image forming apparatus 10 and printed on paper. The page image reading device 40 may further include a printing unit to print the decrypted image on paper. In this case, the printing unit is realized with devices equivalent to the image processing parts 16, exposure devices 22, paper transport arrangements, print engines, etc. of the image forming apparatus 10. The decrypted image may be displayed on a control panel, not shown, installed on the page image reading device 40 or a display such as a display.

In this manner, the page image reading device 40 reads an encrypted image and an image including fiber information, reads fiber properties of a paper sheet on which the read image is printed, and, if the fiber information embedded in the read image matches with information representing the read fiber properties, decrypts the encrypted image region included in the read image. Therefore, the page image reading device 40 realizes an image processing device according to an exemplary embodiment of the invention. The above process may be carried out under control of a program that runs on the page image reading device 40.

An image forming system according to an exemplary embodiment of the invention includes the image forming apparatus 10 and the page image reading device 40. The image forming apparatus 10 and the page image reading device 40 are connected, so that image data which is output from the page image reading device 40 is input to the image forming apparatus 10.

The image forming apparatus 10 may encode a password entered by a user and this encoded password may be included in a two-dimensional code or the like. In this case, if there is a further match between the password derived from the page image and the password entered by the user, the page image reading device 40 decrypts an invisible image region and makes this region visible.

Next, a second exemplary embodiment of the invention is described.

The second exemplary embodiment of the invention differs from the first exemplary embodiment in that a print page includes marking (position information) to mark off an encrypted invisible region.

Figure 8:
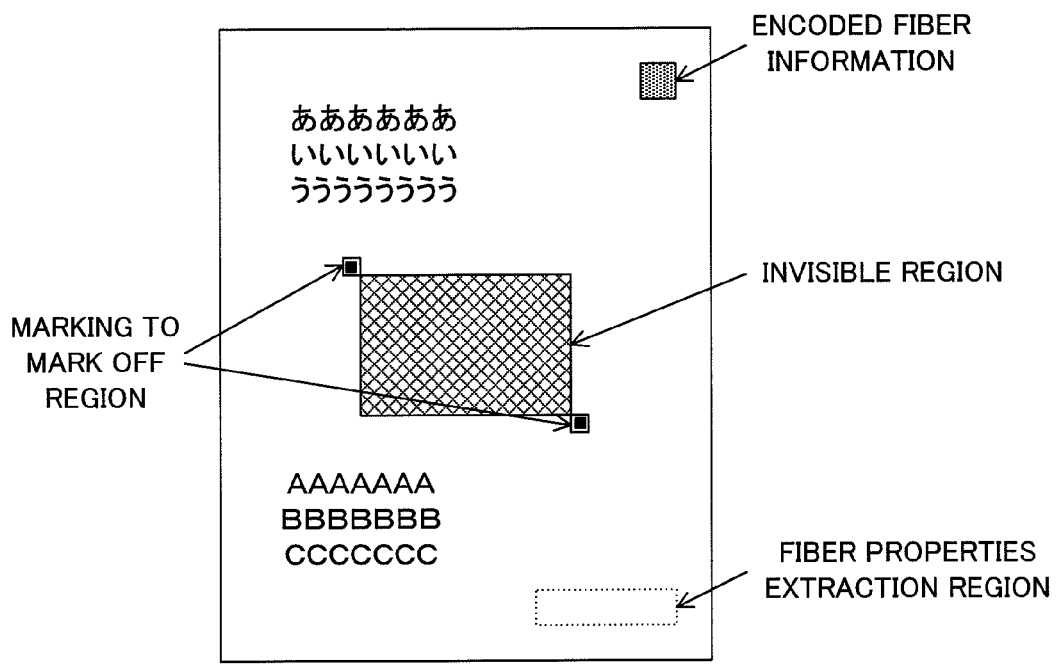
FIG. 8 illustrates a print page that is output from the image forming apparatus 10 according to a second exemplary embodiment of the invention.

FIG. 8 illustrates a print page which is output from the image forming apparatus 10 in the second exemplary embodiment.

As is shown in FIG. 8, the image forming apparatus 10 incorporates marking to make an invisible region recognizable into an image and prints the image. In the page image reading device 40 of the second exemplary embodiment, the image processing part 58 locates the image region to be decrypted by detecting this marking.

The image forming apparatus 10 may not include marking in a print page in a case where an image region that is encrypted is selected arbitrarily. In this case, the page image reading device 40 prompts the user to enter position information (such as, for example, coordinates) of an image region to be decrypted and decrypts the image region located by the position information entered by the user.

Next, a third exemplary embodiment of the invention is described.

The third exemplary embodiment of the invention differs from the first exemplary embodiment in that the image forming apparatus 10 prints an image on a paper sheet that is different from a paper sheet used for reading paper fiber properties. In the third exemplary embodiment, the paper sheet from which paper fiber properties are read is simply used as a key. Therefore, in the third exemplary embodiment, the page image reading device 40 reads fiber properties of a paper sheet from which paper fiber properties are read in the image forming apparatus 10 and compares information representing the fiber properties with fiber information derived from a two-dimensional code on the scanned page. If there is a match between the pair of fiber information, decryption is performed.

Next, a fourth exemplary embodiment of the invention is described.

The fourth exemplary embodiment of the invention differs from the first exemplary embodiment in that an encoded data code such as a two-dimensional code is not printed on a print page. So, encoded fiber information is not included in a print page output by the image forming apparatus 10. Consequently, in the page image reading device 40 of the fourth exemplary embodiment, comparison between encoded data A and encoded data B is not performed. When the page image reading device 40 receives a command for decryption, the image processing part 58 of the page image reading device 40 performs decryption using encoded data corresponding to fiber properties acquired by the scanned page paper fiber reading part 42.

The present invention may be embodied in other specific forms without departing from its spirit or characteristics. The described exemplary embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. An image forming apparatus comprising:
   a paper fiber reading unit that reads fiber properties of a paper sheet;
   an encryption unit that encrypts at least a part of an input image using an encryption technique based on the fiber properties read by the paper fiber reading unit; and
   a printing unit that prints an encrypted image portion encrypted by the encryption unit and an image including information representing the fiber properties read by the paper fiber reading unit on the paper sheet whose fiber properties are read by the paper fiber reading unit.

2. An image processing device comprising:
   an image reading unit that reads an encrypted image portion and an image including fiber information;
   a paper fiber reading unit that reads fiber properties of a paper sheet on which the image read by the image reading unit is printed; and
   a determination unit that determines whether to decrypt an encrypted image region included in the image read by the image reading unit, based on fiber information embedded in the image read by the image reading unit and information representing the fiber properties read by the paper fiber reading unit.

3. An image processing device according to claim 2, further comprising a decryption unit that decrypts an encrypted image region included in the image read by the image reading unit, if the determination unit determines the fiber information embedded in the image read by the image reading unit and the information representing the fiber properties read by the paper fiber reading unit matches.

4. The image processing device according to claim 3, further comprising:
   a printing unit that prints an image including an image region decrypted by the decryption unit on a paper sheet.

5. An image forming system comprising:
   a first paper fiber reading unit that reads fiber properties of a paper sheet;
   an encryption unit that encrypts at least a part of an input image using an encryption technique based on the fiber properties read by the first paper fiber reading unit;
   a printing unit that prints an image portion encrypted by the encryption unit and an image including information representing the fiber properties read by the first paper fiber reading unit on the paper sheet whose fiber properties are read by the first paper fiber reading unit;
   an image reading unit that reads an image printed by the printing unit;
   a second paper fiber reading unit that reads fiber properties of a paper sheet on which the image is printed by the printing unit; and
   a decryption unit that decrypts an encrypted image region included in the image read by the image reading unit, if there is a match between fiber information embedded in the image read by the image reading unit and information representing the fiber properties read by the second paper fiber reading unit.

6. An image forming system according to claim 5, wherein the printing unit prints the image portion encryption unit and the image including information representing the fiber properties read by the first paper fiber reading unit on the paper sheet different from the paper sheet whose fiber properties are read by the first paper fiber reading unit, and the decryption unit decrypts the encrypt image region included in the image read by the image reading unit if there is a match between fiber information embedded in the image read by the image reading unit and information representing the fiber properties read by the second fiber reading unit.

7. A paper medium having fiber properties, comprising:
   a visual code in which information representing the fiber properties in a given region is encoded; and
   an image region in which an image is encoded based on fiber information encoded in the visual code.

8. A non-transitory computer readable medium storing a program comprising instructions causing the computer to execute steps in an image forming apparatus including a computer, the steps comprising:
   reading fiber properties of a paper sheet;
   encrypting at least a part of an input image using an encryption technique based on the read fiber properties; and
   controlling a print operation to print an encrypted image portion and an image including information representing the fiber properties on the paper sheet whose fiber properties are read.

9. A non-transitory computer readable medium storing a program comprising instructions causing the computer to execute steps in an image processing device including a computer, the steps comprising:
   reading an image including an encrypted image portion and fiber information;
   reading fiber properties of a paper sheet on which the read image is printed; and
   decrypting an encrypted image region included in the read image, if there is a match between fiber information embedded in the read image and information representing the read fiber properties.

10. A non-transitory computer readable medium storing a program according to claim 9, further comprising determining whether to decrypt an encrypted image region included in the read image, based on fiber information embedded in the read image and information representing the read fiber properties.

11. An image forming method comprising:
    reading fiber properties of a paper sheet;
    encrypting at least a part of an input image using an encryption technique based on the fiber properties read by the paper fiber reading unit; and
    printing an encrypted image portion encrypted by the encryption unit and an image including information representing the fiber properties read by the paper fiber reading unit on the paper sheet whose fiber properties are read by the paper fiber reading unit.

12. An image processing method comprising:
    reading an encrypted image portion and an image including fiber information;
    reading fiber properties of a paper sheet on which the image read by the image reading unit is printed; and
    determining whether to decrypt an encrypted image region included in the image read by the image reading unit, based on fiber information embedded in the image read by the image reading unit and information representing the fiber properties read by the paper fiber reading unit.

* * * * *